US008938906B2

(12) United States Patent
Hey et al.

(10) Patent No.: US 8,938,906 B2
(45) Date of Patent: Jan. 27, 2015

(54) WINTER FISH TRAPS AND METHODS OF USING THE SAME

(75) Inventors: Donald L. Hey, Evanston, IL (US); Roy C. Heidinger, Carbondale, IL (US); Robert J. Curran, Gurnee, IL (US)

(73) Assignee: Donald L. Hey, Evanston, IL (US)

(*) Notice: Subject to any disclaimer, the term of this patent is extended or adjusted under 35 U.S.C. 154(b) by 362 days.

(21) Appl. No.: 13/404,489

(22) Filed: Feb. 24, 2012

(65) Prior Publication Data
US 2013/0219769 A1    Aug. 29, 2013

(51) Int. Cl.
*A01K 69/08* (2006.01)
(52) U.S. Cl.
USPC ............................................ 43/4.5; 43/7
(58) Field of Classification Search
CPC ........ A01K 69/06; A01K 69/08; A01K 69/10
USPC .......... 43/7, 8, 9.1, 11, 12, 4.5, 100, 102–105
See application file for complete search history.

(56) References Cited

U.S. PATENT DOCUMENTS

| 1,744,412 | A | * | 1/1930 | Patterson | 43/66 |
| 2,723,481 | A | * | 11/1955 | Schwartz, Sr. | 43/7 |
| 3,089,274 | A | * | 5/1963 | Dethloff | 43/4.5 |
| 3,209,484 | A | * | 10/1965 | Beamer | 43/100 |
| 3,300,890 | A | * | 1/1967 | Thomassen | 43/100 |
| 3,678,612 | A | * | 7/1972 | Hendrickson | 43/66 |
| 4,604,823 | A | * | 8/1986 | Ponzo | 43/105 |
| 5,065,539 | A | * | 11/1991 | Monzyk et al. | 43/4 |
| 2010/0293831 | A1 | * | 11/2010 | Hreinsson et al. | 43/4.5 |
| 2013/0047488 | A1 | * | 2/2013 | Hey et al. | 43/4.5 |

FOREIGN PATENT DOCUMENTS

WO    WO2012003537 A1 * 1/2012 ............. A01K 69/10

* cited by examiner

*Primary Examiner* — David Parsley
*Assistant Examiner* — Danielle Clerkley
(74) *Attorney, Agent, or Firm* — Drinker Biddle & Reath LLP

(57) ABSTRACT

Winter fish traps and methods of using the same are disclosed. A method of trapping fish is provided that includes locating a substantially immobile group of fish in a body of water, providing a semi-rigid water-permeable trap having a bottom opening, lowering the trap opening over the group of fish onto a bottom surface of the body of water to trap the group of fish, remotely operating a semi-rigid door to cover the trap opening while the fish trap is resting on the bottom surface, and retrieving the fish trap from the body of water.

17 Claims, 10 Drawing Sheets

US 8,938,906 B2

WINTER FISH TRAPS AND METHODS OF USING THE SAME

FIELD OF THE DISCLOSURE

This disclosure relates generally to trapping fish, and, more particularly, to winter fish traps and methods of using the same.

BACKGROUND

The common carp and other scavenger fish have become ubiquitous in many rivers and streams. Their habits of "rooting" and benthic (e.g., bottom) feeding often cause high turbidity levels, increased concentrations of suspended solids, destruction of emergent aquatic plants, as well as excessive competition with native fish species. Consequently, in many streams and rivers where carp are abundant, the water quality decreases as does the population of native fish.

Carp densities, however, are difficult to control. Conventional efforts to control carp have been based primarily on removal and poisoning techniques, largely with ineffectual and sometimes detrimental results. Carp quickly re-invade areas from which they have been removed, and many of the poisons are not specific or effective enough to eliminate the carp while allowing the native fish species to survive. Thus, large and growing populations of carp remain a detriment to the health of many rivers and streams.

Carp can be particularly damaging to aquatic plants. Disruption of the soft substrates on stream and lake bottoms as a result of feeding by carp dislodges or harms many aquatic plants. Additionally, the increased turbidity caused by the disruption of bottom substrates decreases the ability of light to penetrate water, which reduces plant reproduction and viability. Consequently, the presence of carp is likely to decrease the success of attempts to re-establish aquatic plants in areas where the plants were once abundant.

SUMMARY

During the winter, when water temperatures are at or near 32° F., the common carp take refuge in deeper, warmer water, in springs, or where substantial ground flow can be found. The carp do not forage during this period, living off fat accumulated during the warmer parts of the year. Of particular interest to the endeavor of trapping carp, is that they form kettles, which comprise a close association of a large number of carp, much like a school of fish, except that the carp in the kettle scarcely move to conserve heat and energy. While embodiments of this disclosure are described with reference to kettles of carp, the examples disclosed herein may be used to trap other groups, schools or kettles of substantially immobile fish.

In accordance with this disclosure, the likely locations of the kettles can be identified based on field measurements of the local bathometry, thermoclines and sources of water. Using this information, the kettles themselves are located by sonar, underwater video camera, or other means. Once a kettle is found, one of the disclosed winter fish traps is lowered over the kettle by, for example, a windlass on a fishing boat. When lowered over the kettle, the fish trap rests on or sinks into the bottom surface of the body of water. Two initially open and hinged panels at the bottom of the trap allow the fish to be captured or trapped inside the winter fish trap.

Once the fish trap is in place over the kettle, the panels are remotely closed using, for example, one or more cables attached to the panels. These cables may be connected to the windlass on the fishing boat. After closing the panels, the fish trap can be retrieved from the body of water. The fish trap may be raised to the surface by means of another cable attached to the windlass. The captured fish are removed from the trap by opening the panels and dumping the fish into an adjacent boat, into a container, onto a lake or stream bank, into a truck, etc. If any native fish are trapped, they can be removed and immediately returned to the lake or stream. The trapped carp fish can be eaten, relocated and released, or otherwise processed or disposed of.

Using the examples disclosed herein, a substantially larger number of carp can be removed from a body of water, as compared to conventional means. For example, substantially all of the carp in a kettle can be removed at the same time using a single one of the disclosed fish traps. Thus, the disclosed examples allow for carp to be removed from a body of water at rates not previously achievable. Accordingly, a body of water may be quickly and effectively rid of carp or other nuisance fish.

A disclosed example method of trapping fish includes locating a substantially immobile group of fish in a body of water, providing a semi-rigid water-permeable trap having a bottom opening, lowering the trap opening over the group of fish onto a bottom surface of the body of water to trap the fish, remotely operating a semi-rigid door to cover the trap opening while the fish trap is resting on the bottom surface, and retrieving the fish trap from the body of water.

A disclosed example fish trap includes a semi-rigid water-permeable chamber having an opening, and a semi-rigid remotely operable door to cover the opening. The chamber to trap fish when the opening is lowered over the fish to rest on a bottom surface of a body of water. The semi-rigid door to be closed while the fish trap is resting on the bottom surface, and to retain the fish in the chamber when the fish trap is retrieved from the bottom surface.

BRIEF DESCRIPTION OF THE DRAWINGS

Features and advantages of the invention will become apparent in review of exemplary embodiments with reference to the attached drawings, in which.

DETAILED DESCRIPTION

While the examples disclosed herein are particularly useful for trapping common carp, the fish traps disclosed herein may be readily modified and/or used to trap other kinds of fish, especially fish that congregate in substantially immobile schools, groups or kettles. Moreover, while wire mesh and cable or zip ties are used herein to construct the disclosed fish traps, many additional or alternative water permeable materials and attachment means may be used to construct the disclosed fish traps. Also, one or more exterior surfaces of the disclosed fish traps may be covered in a water impermeable or semi-impermeable transparent material. Furthermore, while dimensions disclosed herein are beneficial for trapping common carp, fish traps having other dimensions may be constructed based on the size(s) and type(s) of fish to be trapped, without departing from the spirit of this disclosure. Further still, while the fish traps disclosed herein are rectangular and pyramidal in shape, other shapes (e.g., round, square, hexagonal, etc.) may be used.

Figure 1:
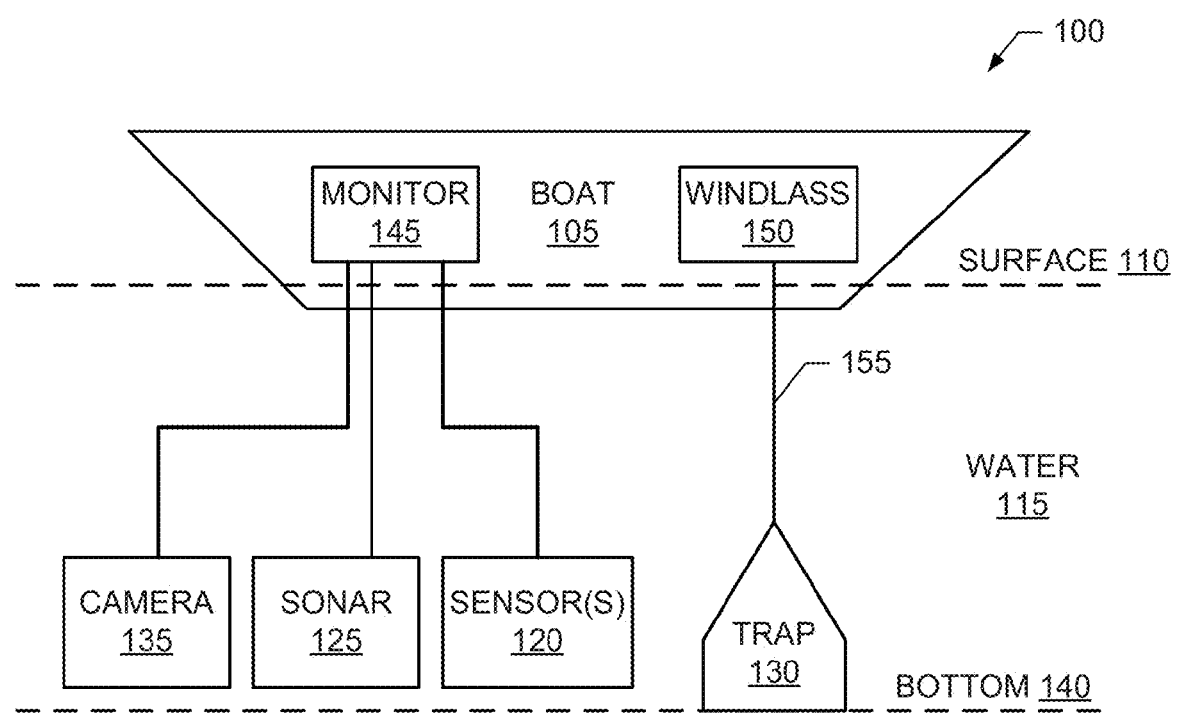
FIG. 1 is a diagram of an example system for trapping fish.

FIG. 1 is a diagram illustrating an example system 100 for trapping carp in the winter time. The system 100 of FIG. 1 is operated from a barge, boat 105, raft, dock or other platform that allows or enables equipment to be operated on or above the surface 110 of a body of water 115. To identify potential or likely locations of kettles (i.e., a large number of substantially co-located carp that scarcely move), the system 100 includes any number and/or type(s) of sensors 120. Example sensors 120 include a bathythermograph, which may be used to detect thermoclines and warmer water, and sonar, which may be used to determine water depth. Field measurements taken with the sensors 120 may be used to identify potential or likely locations of kettles. That is, the field measurements may be used to identify deeper and/or warmer areas that are more attractive locations for kettles.

To locate kettles, the system 100 includes a fish finder or side-scanning sonar 125. The side-scanning sonar 125 can be used to determine which of the likely kettle locations identified using field measurements actually contains a kettle.

To assist in the lowering of a fish trap 130 over a kettle located using the side-scanning sonar 125, the system 100 may include an underwater camera 135. The underwater camera 135 allows images of a kettle and the fish trap 130 to be viewed by a person on the boat 105, thus enabling the person to accurately lower the fish trap 130 over the kettle such that the fish trap 130 comes to rests on or sinks partially into the bottom 140 of the body of water 115. By accurately positioning and lowering the fish trap 130 over the kettle, a substantial portion of the fish in the kettle can be trapped.

When lowered over the kettle, the fish become trapped between the fish trap 130 (which has an initially open bottom) and the bottom 140. As described in more detail below, when panels, members or doors of the fish trap 130 are remotely operated to close the bottom of the fish trap 130, the fish become trapped within the fish trap 130 itself, and the fish trap 130 can be retrieved from the bottom 140 without the fish being able to escape. Example manners of constructing the fish trap 130 are illustrated in FIGS. 3A-3D and FIGS. 4A-4E.

To control the sensors 120, the sonar 125 and the camera 135, and present measurements, results or images collected by the sensors 120, the sonar 125 and the camera 135, the system 100 may include any number and/or type(s) of monitors 145. In some examples, different monitors 145 are used for each of the sensors 120, the sonar 125 and the camera 135. An example monitor 145 is a television monitor coupled to the underwater video camera 135.

To raise and lower the fish trap 130, the system 100 may include a windlass 145 or other device or mechanism capable of raising and lowering the fish trap 130 by means of a cable 155. In some examples, one or more additional cables between the windlass 150 and fish trap 130 are used to operate the panels, members or doors of the fish trap 130 used to open and close the fish trap 130. In other examples, the panels, members or doors may be motorized, electrically activated, magnetic or spring loaded. For instance, the panels, members or doors may automatically close when the weight of the fish trap 130 resting on the bottom 140 causes a mechanical latch to open. Of course, other means and methods of opening and closing the panels, members or doors may be used.

Figure 2:
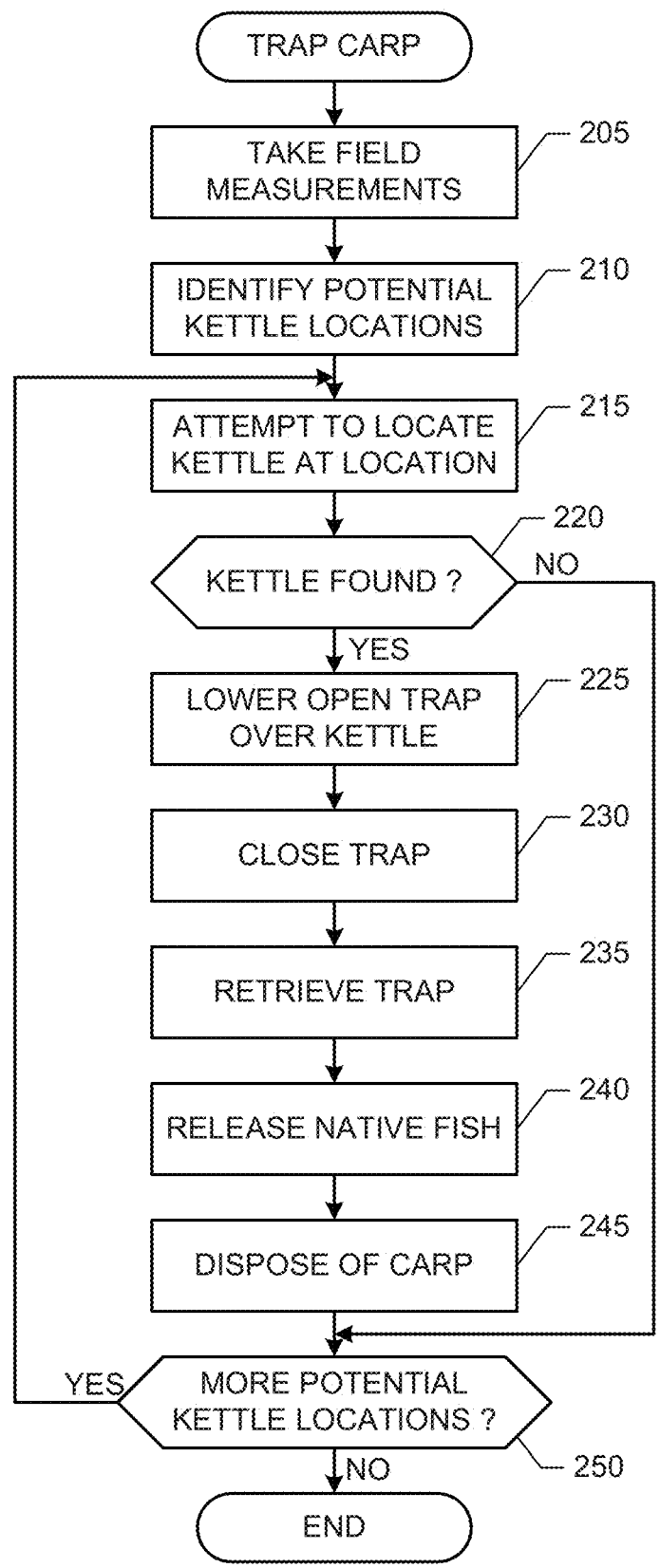
FIG. 2 is a flowchart of an example method of trapping fish.

FIG. 2 is a flowchart illustrating an example method that may be carried out to trap carp during the winter time. The example method of FIG. 2 begins with taking field measurements using, for example, the sensors 120 (block 205). Likely or potentially kettle locations are identified based on the field measurements (block 210).

Starting with a first potential kettle location, the side-scanning sonar 125 is used to locate a kettle (if any) at the location (block 215). If a kettle is found (block 220), the fish trap 130 is lowered over the kettle on the bottom 140 using the camera 135 for improved accuracy (block 225). Once lowered, the bottom of the fish trap 130 is closed (block 230), and the fish trap 130 is retrieved (block 235). Any native fish that are inadvertently trapped are released (block 240), and trapped carp are appropriated processed or disposed of (block 245). If there are additional likely kettle locations (block 250), control can return to block 215 to attempt to locate another kettle (if any). Otherwise, the method of FIG. 2 ends.

Returning to block 220, if a kettle is not found (block 220), control proceeds to block 250 to determine if there are any additional likely kettle locations.

Figure 3A:
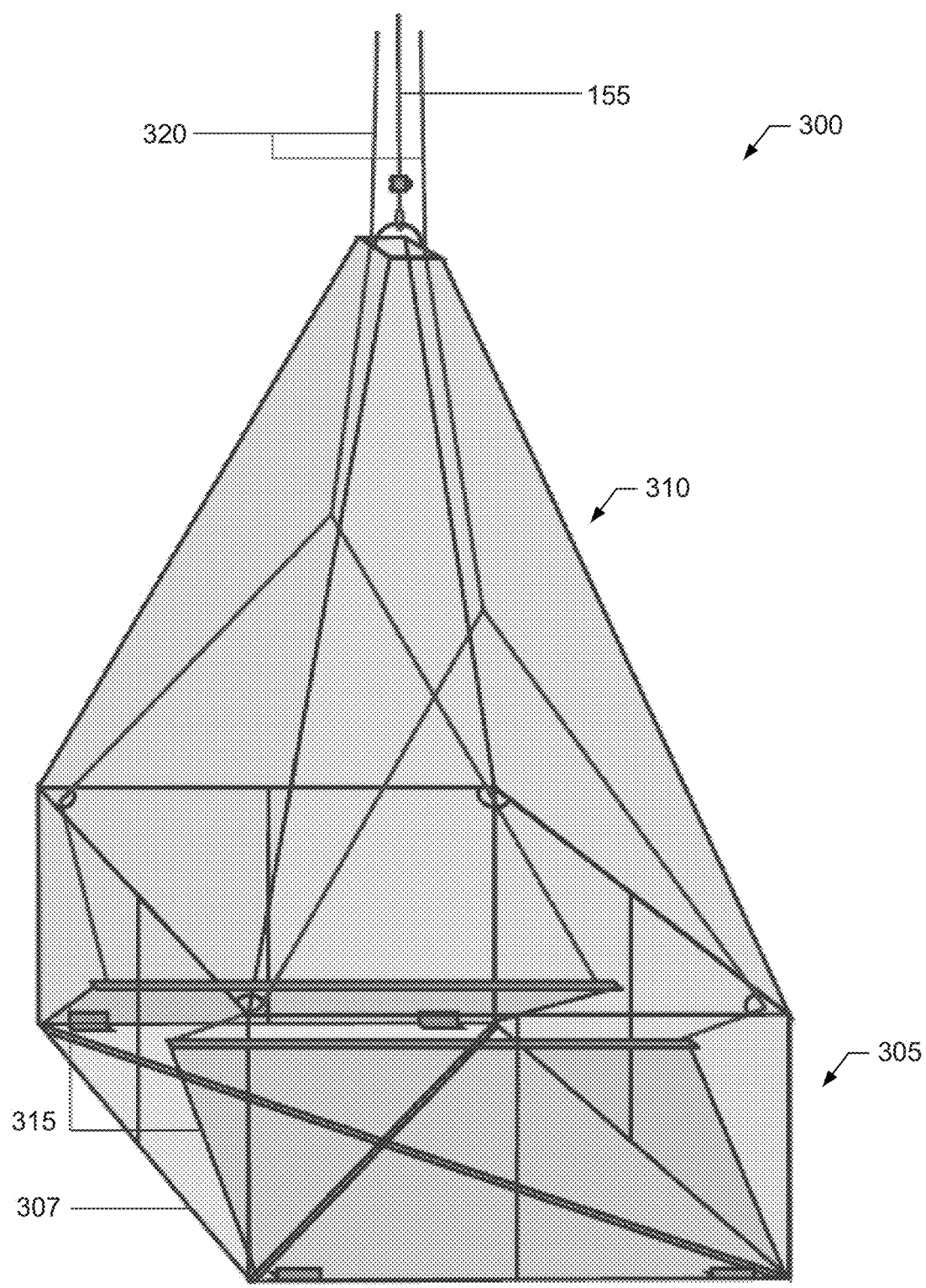
FIG. 3A is a perspective drawing of an example manner of constructing the fish trap of FIG. 1.
Figure 3B:
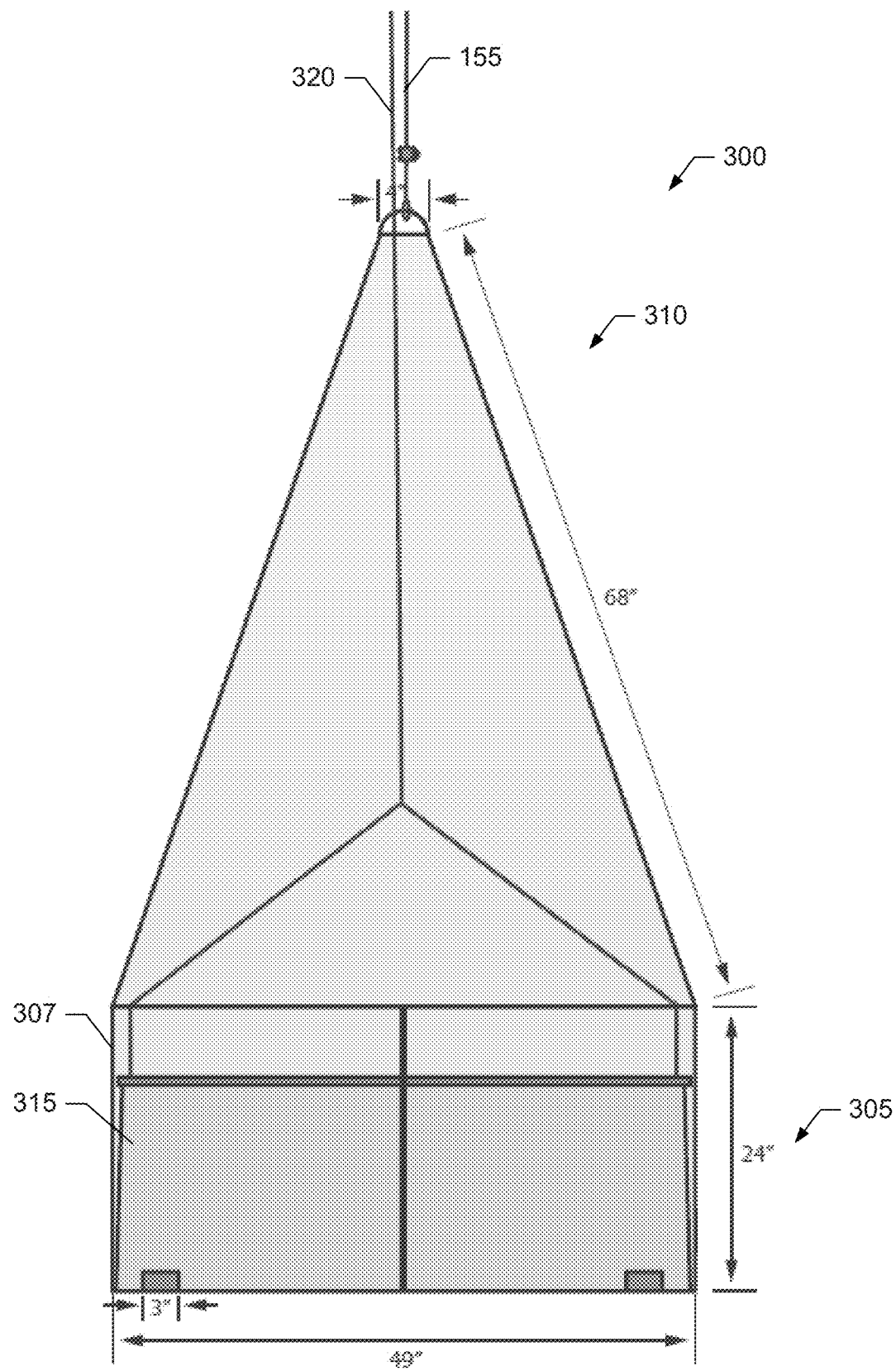
FIG. 3B is a side view of the example fish trap of FIG. 3A.
Figure 3C:
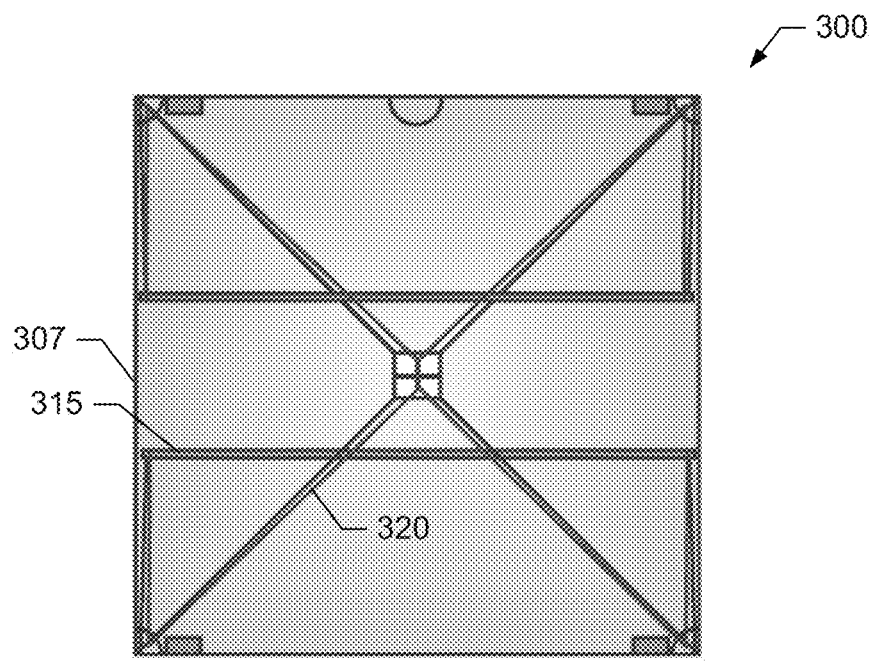
FIG. 3C is a top view of the example fish trap of FIG. 3A.
Figure 3D:
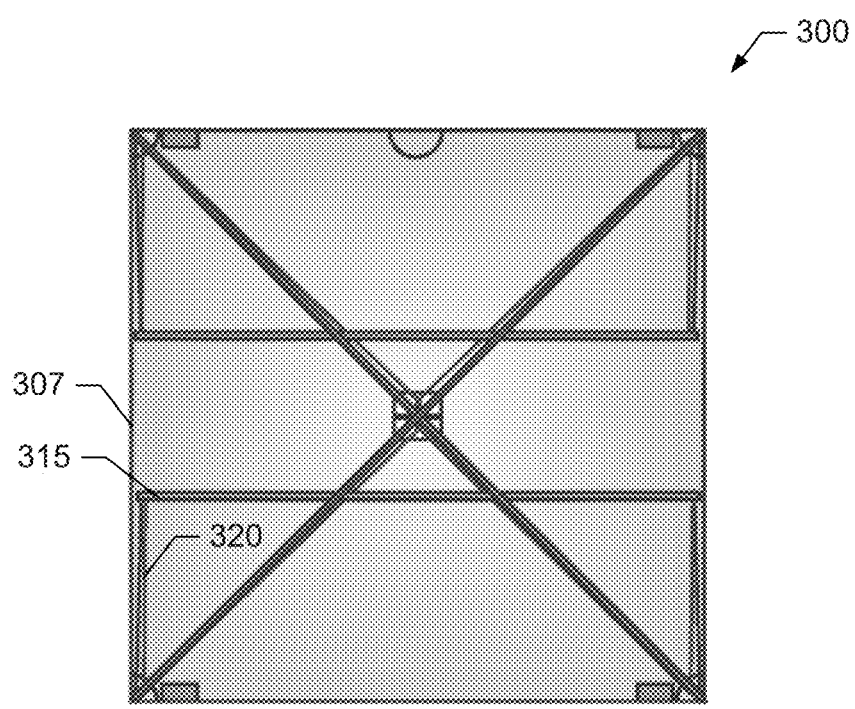
FIG. 3D is a bottom view of the example fish trap of FIG. 3A.

FIG. 3A is a perspective drawing of an example fish trap 300 that may be used to implement the fish trap 130 of FIG. 1. FIGS. 3B, 3C and 3D are side, top, and bottom views, respectively, of the example fish trap 300. The fish trap 300 has a rectangular base portion 305 having four fixed sides 307, and a pyramidal-shaped upper portion 310. The cable 155 used to raise and lower the fish trap 300 is attached to the top of the upper portion 310. The base portion 305 includes two hinged doors 315 that can be opened to allow the fish trap 300 to be placed over a kettle, and closed to keep trapped fish from escaping. When the fish trap 300 is initially placed over a kettle, fish are trapped between the fish trap 300 and the bottom surface of a body of water. As the doors 315 are closed, the fish become trapped within the fish trap 300

In the illustrated example, each of the hinged doors 315 is attached to a respective cable 320 that allows the hinged doors 315 to be independently opened and closed. For example, after being placed over a kettle, a first of the doors 315 may be closed by releasing tension on its corresponding cable 320. Preferably, the door 315 closes in response to gravity when tension on the cable 320 is released. While the first door 315 is being closed, trapped fish will move over and upward to allow the first door 315 to close. Once the first door 315 is closed, the second of the doors 315 may be similarly closed. Preferably the doors 315 are closed slowly to allow the fish time to move upward and/or over as the doors 315 are closed. Once the doors 315 are closed, they remain closed due to gravity. Additionally, as the fish trap 300 is retrieved, force exerted by fish against the doors 315 will assist in ensuring the doors 315 remain closed. In some examples, a latching mechanism may be included to "lock" the doors 315 in the closed position.

Figure 4A:
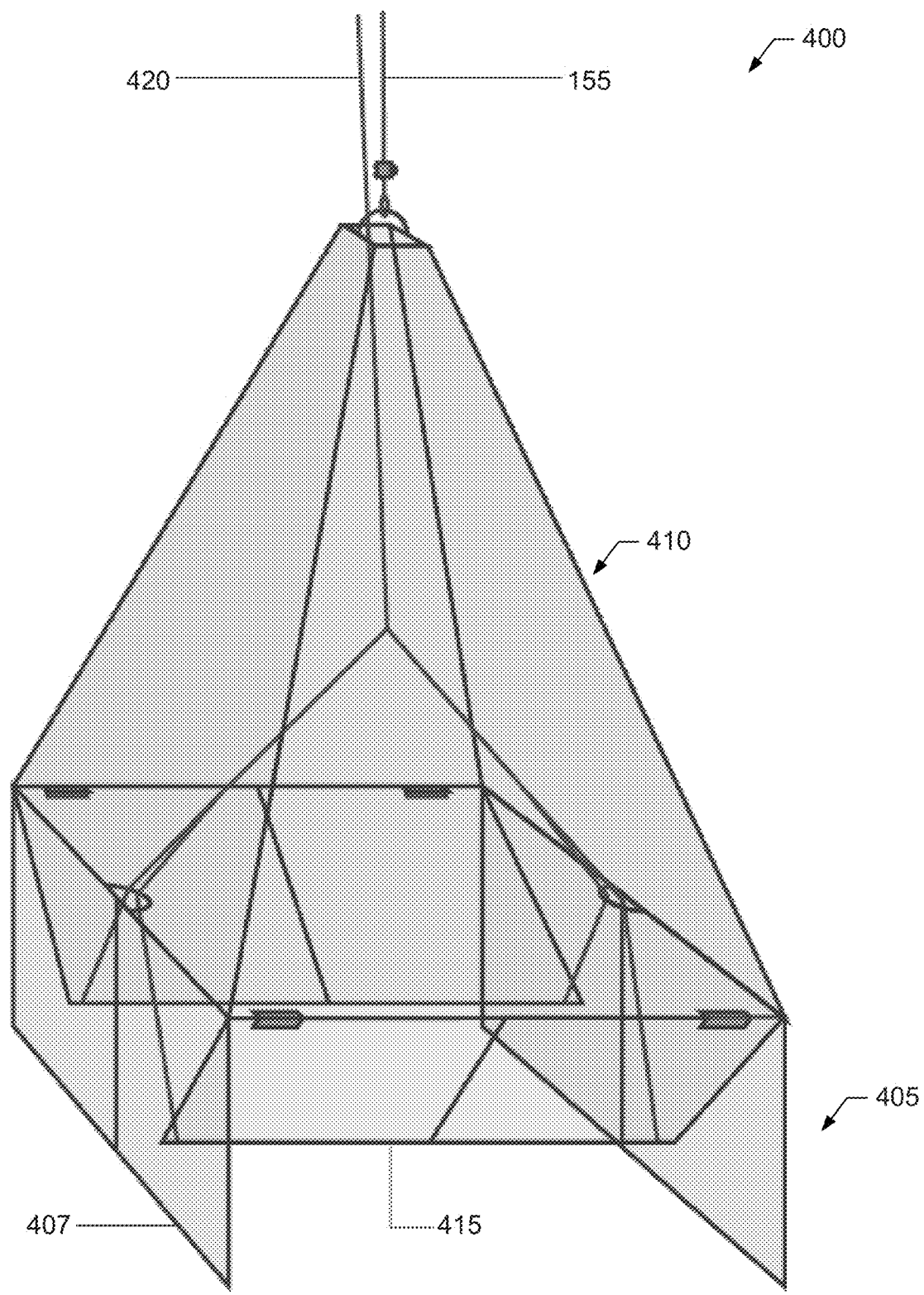
FIG. 4A is a perspective drawing of another example manner of constructing the fish trap of FIG. 1, with doors partially open.
Figure 4B:
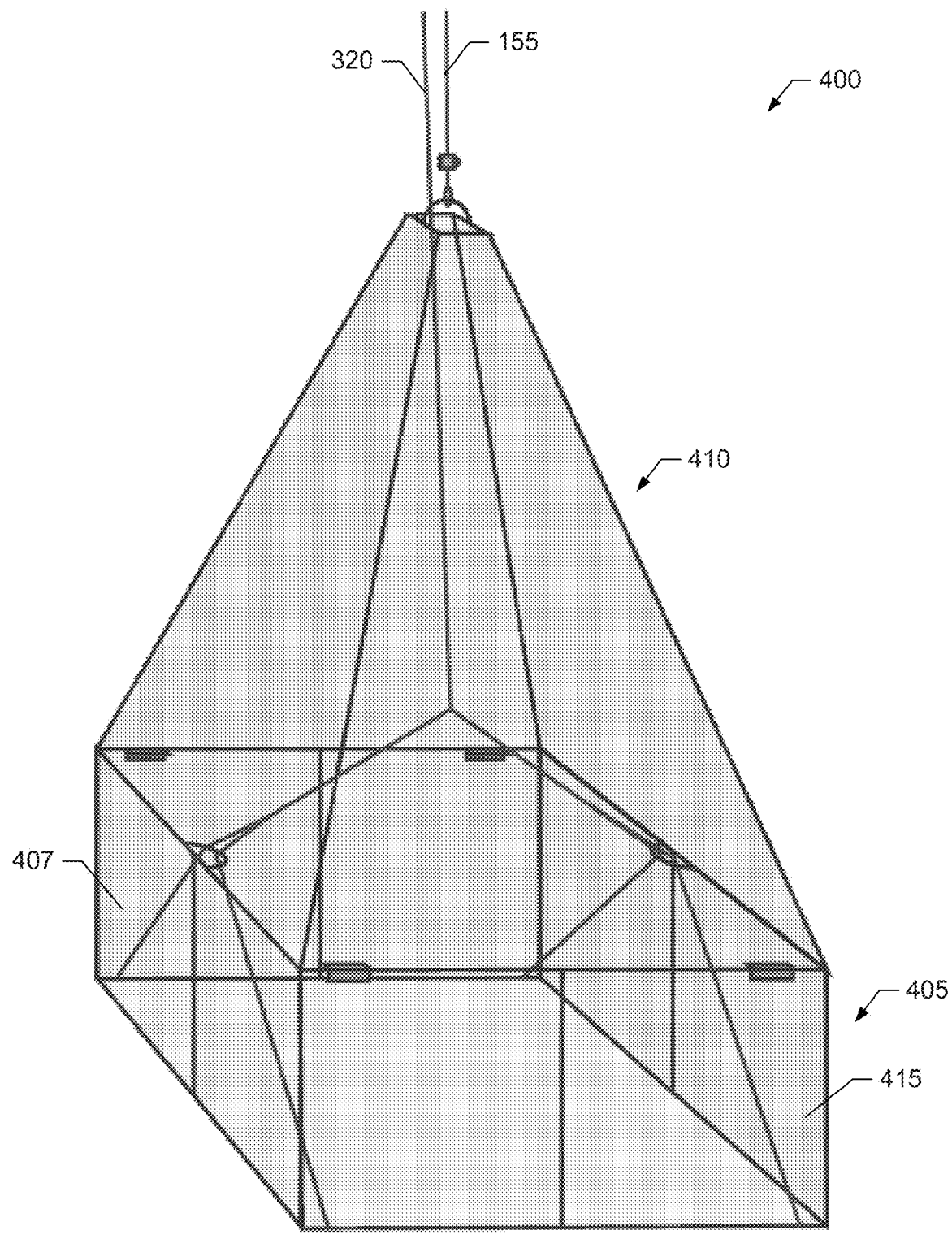
FIG. 4B is a perspective drawing of the fish trap of FIG. 4A, with the doors fully open.
Figure 4C:
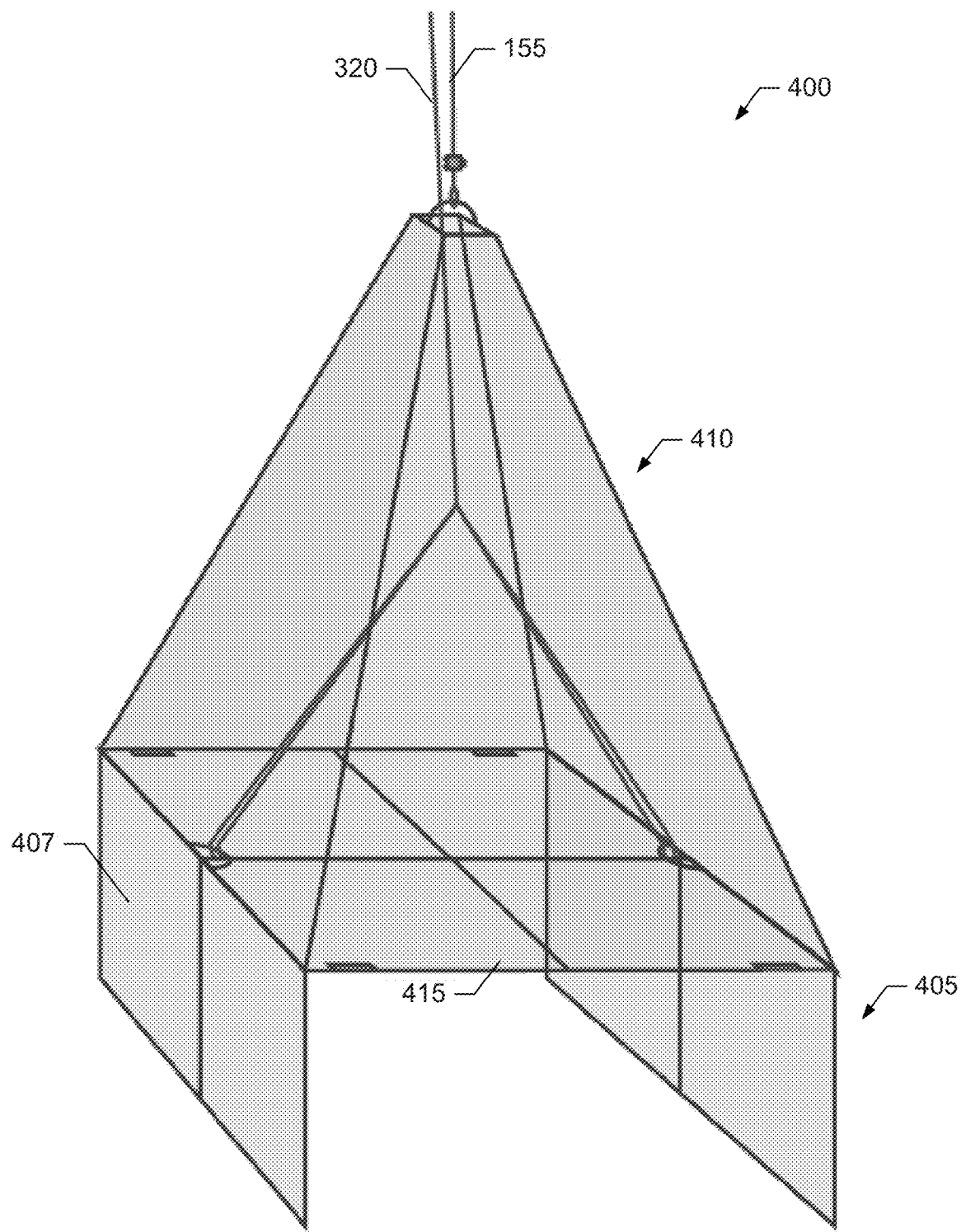
FIG. 4C is a perspective drawing of the fish trap of FIG. 4A, with the doors fully closed.
Figure 4D:
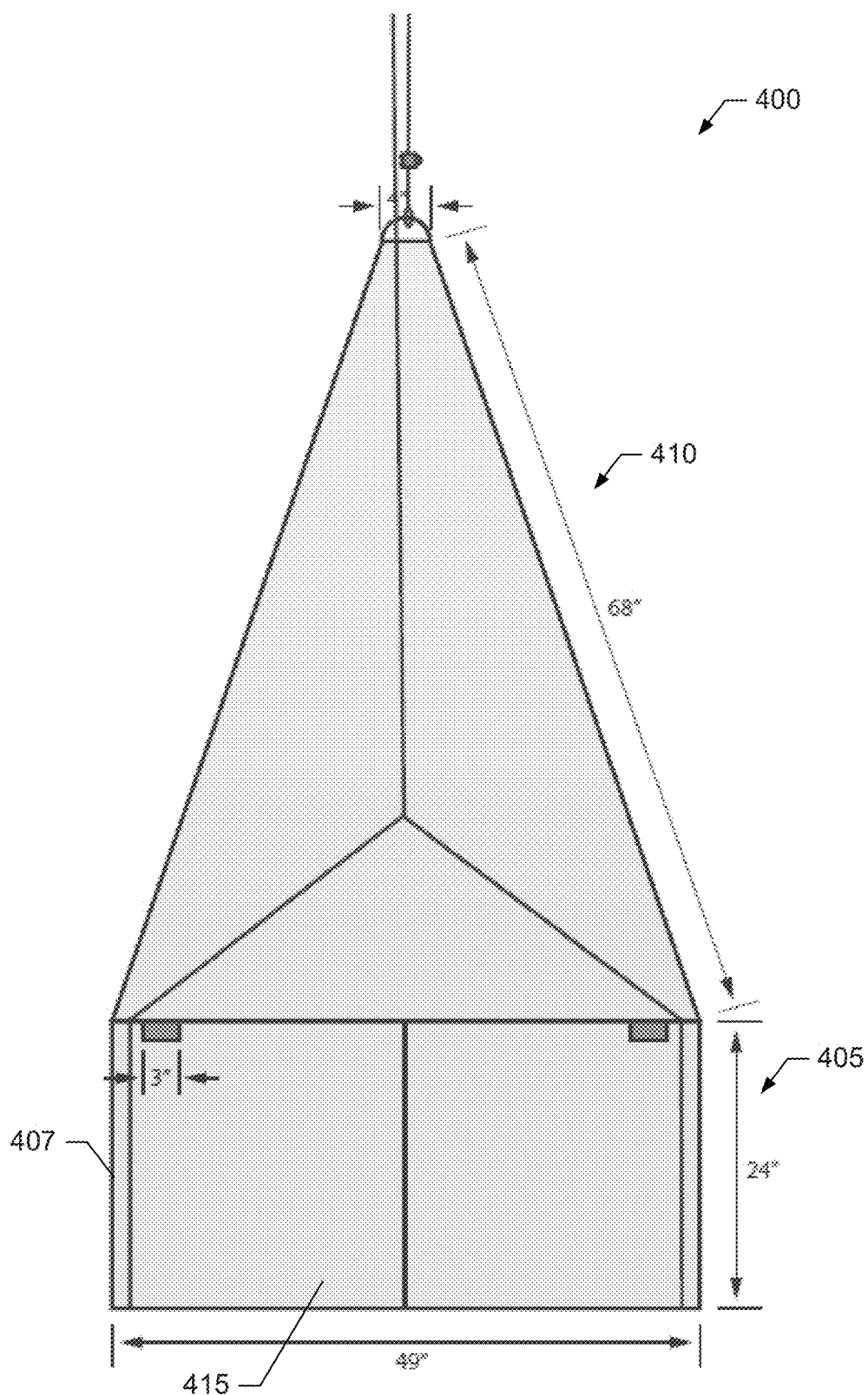
FIG. 4D is a side view of the example fish trap of FIG. 4A.
Figure 4E:
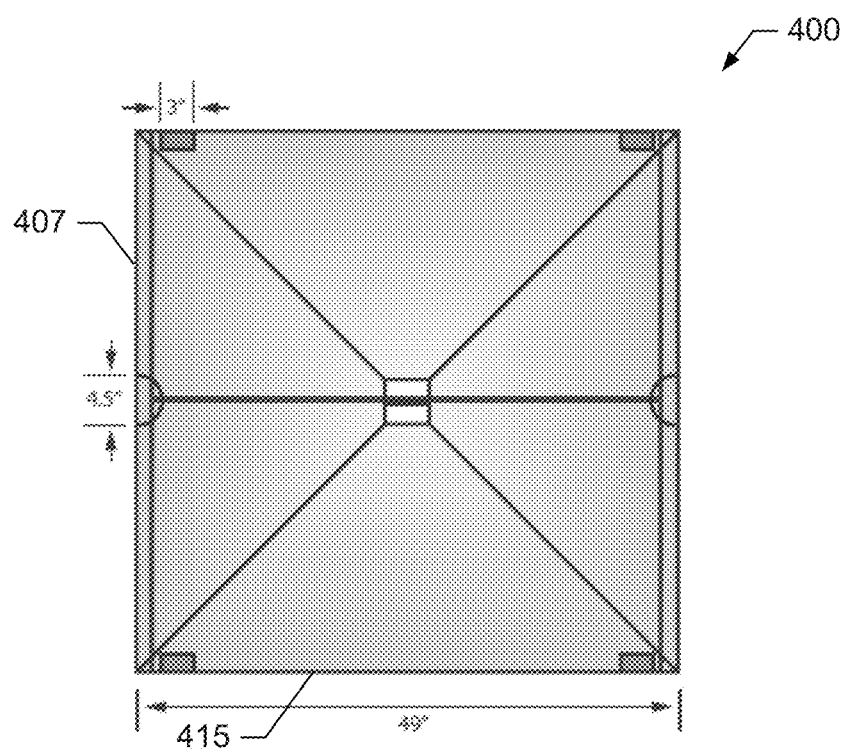
FIG. 4E is a top view of the example fish trap of FIG. 4A.

FIG. 4A is a perspective drawing of another example fish trap 400 that may be used to implement the fish trap 130 of FIG. 1. FIG. 4B is another perspective drawing of the fish trap 400 with the doors fully open. FIG. 4C is yet another perspective drawing of the fish trap 400 with the doors fully closed. FIGS. 4D and 4E are side and top views, respectively, of the example fish trap 400.

The fish trap 400 has a rectangular base portion 405, and a pyramidal-shaped upper portion 410. Compared to the fish trap 300, the base portion 405 of the fish trap 400 only has two fixed sides 407. The cable 155 used to raise and lower the fish trap 400 is attached to the top of the upper portion 410.

The base portion 405 includes two hinged doors 415 that can be fully lowered (see FIG. 4B) as the fish trap 400 is placed over a kettle, and raised to keep trapped fish from escaping (see FIG. 4C). When the fish trap 400 is initially placed over the kettle, fish are trapped between the fish trap 400 and the bottom surface of a body of water. As the doors 415 are fully closed (see FIG. 4C), the fish become trapped within the upper portion 410 of the fish trap 400.

In the illustrated example, the hinged doors 415 are attached to a cable 420 that allows the hinged doors 415 to be simultaneously raised in response to tension applied to the cable 420. Preferably, the hinged doors 415 are raised quickly to reduce the chances that fish can escape underneath a closing door 415. In some examples, the closing of the hinged doors 415 "sweeps" the fish into the upper portion 410. Once the doors 415 are closed, they remain closed due to tension on the cable 420. In some examples, a latching mechanism may be included to "lock" the doors 415 in the closed position.

The fish traps 300 and 400 are semi-rigid and may be constructed of panels or pieces of galvanized or painted steel wire mesh held together or to a frame with cable or zip ties. As used herein, semi-rigid is used to denote a structure that generally holds its shape or form but may be partially flexible. For example, pieces of the flexible wire mesh may be attached to a generally stiff frame. In some examples, one inch by one inch wire mesh is used. However, other water-permeable materials may be used. Also, hinges, couplings, wire and/or clasps may be used to connect the pieces of wire mesh or other water permeable material(s) that make up the fish traps 300 and 400. Moreover, other kinds of wire mesh such as plastic coated wire mesh, chicken wire, etc. may be used to construct the fish traps 300 and 400. Further still, one or more exterior surfaces of the fish traps 300 and 400 may be covered in a water impermeable or semi-impermeable transparent material.

Trapped fish can be removed by, for example, opening the doors 315, 415. In accordance with wildlife laws, trapped fish may be kept or released back into the wild. For example, if local fishing laws do not allow the trapping of game fish, any inadvertently or unintentionally trapped game fish are preferably released. However, when a particular species of fish such as carp is being intentionally trapped, the intentionally trapped fish may be destroyed, relocated and released and/or eaten. Because, in the illustrated embodiment, the fish traps 300, 400 are at least partially constructed of a water permeable material such as wire mesh so that aerated and nutrient-containing water can easily move through the fish traps 300, 400, trapped fish are kept alive and fresh (at least for a period of time) in the fish traps 300, 400.

For the purposes of promoting an understanding of the principles of this disclosure, reference has been made to exemplary embodiments illustrated in the drawings, and specific language has been used to describe these embodiments. However, no limitation of the scope of this disclosure is intended by this specific language, and this disclosure encompasses all embodiments that would normally occur to one of ordinary skill in the art.

The particular implementations shown and described herein are illustrative examples, and do not limit the scope of this disclosure in any way. Moreover, no item or component is essential to the disclosed embodiments unless the element is specifically described as "essential" or "critical".

The use of the terms "a" and "an" and "the" and similar referents in the context of describing the disclosed embodiments (especially in the context of the following claims) are to be construed to cover both the singular and the plural. Furthermore, any recitation of ranges of values herein is merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as" or "for example") provided herein, is intended merely to better illuminate the embodiments and does not pose a limitation on the scope of this disclosure unless otherwise claimed. Numerous modifications and adaptations will be readily apparent to those skilled in this art without departing from the spirit and scope of this disclosure.

Although certain example methods, apparatuses and articles of manufacture have been described and disclosed herein, the scope of coverage of any patent resulting from this disclosure is not limited thereto. On the contrary, this disclosure encompasses and covers all methods, apparatuses and articles of manufacture fairly falling within the scope of the appended claims.

What is claimed is:

1. A method of trapping a substantially immobile group of fish in a body of water comprising:
    locating the substantially immobile group of fish in the body of water;
    providing a semi-rigid water-permeable trap having a base portion with sides defining a bottom opening at the distal end of the trap, and an inwardly-opened door inside the trap and behind the opening;
    lowering the trap opening over the group of fish onto a bottom surface of the body of water to trap the substantially immobile group of fish;
    remotely closing the door to block the opening while the opening is resting on the bottom surface to trap the group of fish within the trap; and
    retrieving the fish trap from the body of water.

2. A method as defined in claim 1 wherein the group of fish comprises a kettle of carp.

3. A method as defined in claim 1, further comprising using sonar to locate the group of fish.

4. A method as defined in claim 3, further comprising using a bathythermograph to identify a likely location of the group of fish, wherein the sonar is used to locate the group of fish at the likely location.

5. A method as defined in claim 1, further comprising:
    operating a first cable to remotely operate the door.

6. A method as defined in claim 1, wherein remotely operating the door comprises remotely operating two independently operable members hinged on respective opposite edges of the opening via respective cables.

7. A method as defined in claim 1, further comprising using an underwater camera to guide the lowering of the trap.

8. A method as defined in claim 1, further comprising sinking the opening into the bottom surface.

9. A fish trap for trapping a substantially immobile group of fish in a body of water comprising:
    a semi-rigid water-permeable chamber having a base portion with sides defining a bottom opening at the distal end of the trap, and a pair of inwardly operable doors, each of the pair of doors is located inside the chamber, hinged on respective opposite sides of the bottom opening, and movable between an open position to permit the trap to be lowered over and receive the immobile kettle of carp before reaching a bottom surface of the body of water, and a closed position to retain the carp in the chamber to enable the carp to be retrieved from the body of water.

10. A fish trap as defined in claim 9, further comprising first and second cables to selectively operate respective ones of the pair of doors remotely from the fish trap.

11. A fish trap as defined in claim 10, further comprising a third cable to lower and raise the fish trap.

12. A fish trap as defined in claim 11, wherein the first, second and third cables are operable from a boat floating on the body of water.

13. A fish trap as defined in claim 9, wherein the bottom opening contacts the bottom surface of the body of water when the fish trap is lowered to rest on the bottom surface of the body of water.

14. A fish trap as defined in claim 13, wherein edges of the bottom opening are sunk into the bottom surface of the body of water.

15. A fish trap as defined in claim 9, further comprising an underwater camera to assist in lowering the fish trap over the fish.

16. A fish trap as defined in claim 9, further comprising sonar to locate the fish.

17. A system for trapping a substantially immobile kettle of carp comprising: a bathythermograph to identify a likely location of the group of immobile fish and sonar to locate the group of fish at the likely location; and a semi-rigid water-permeable chamber having a base portion with sides defining a bottom opening at the distal end of the trap, and a pair of inwardly operable doors, each of the pair of doors is located inside the chamber, hinged on respective opposite sides of the bottom opening, and movable between an open position to permit the trap to be lowered over and receive the immobile kettle of carp before reaching a bottom surface of the body of water, and a closed position to retain the carp in the chamber to enable the carp to be retrieved from the body of water.

* * * * *